US010935973B2

(12) United States Patent
Pedersen et al.

(10) Patent No.: US 10,935,973 B2
(45) Date of Patent: Mar. 2, 2021

(54) GENERATION OF SOLUTION DATA FOR AUTONOMOUS VEHICLES TO NEGOTIATE PROBLEM SITUATIONS

(71) Applicants: Nissan North America, Inc., Franklin, TN (US); United States of America as Represented by the Administrator of NASA, Washington, DC (US)

(72) Inventors: Liam Pedersen, San Francisco, CA (US); Maarten Sierhuis, San Francisco, CA (US); Hans Utz, Campbell, CA (US); Mauro Della Penna, San Francisco, CA (US); Terrence Fong, Moffett Field, CA (US); Mark Allan, Campbell, CA (US); Maria Bualat, San Jose, CA (US); Eric Schafer, Kentfield, CA (US)

(73) Assignees: Nissan North America, Inc., Franklin, TN (US); United States of America as Represented by the Administrator of NASA, Washington, DC (US)

( * ) Notice: Subject to any disclaimer, the term of this patent is extended or adjusted under 35 U.S.C. 154(b) by 0 days.

(21) Appl. No.: 16/466,748

(22) PCT Filed: Dec. 6, 2017

(86) PCT No.: PCT/US2017/064815
§ 371 (c)(1),
(2) Date: Jun. 5, 2019

(87) PCT Pub. No.: WO2018/106755
PCT Pub. Date: Jun. 14, 2018

(65) Prior Publication Data
US 2020/0064831 A1 Feb. 27, 2020

Related U.S. Application Data

(60) Provisional application No. 62/430,900, filed on Dec. 6, 2016.

(51) Int. Cl.
*G05D 1/00* (2006.01)
*G08G 1/01* (2006.01)
(Continued)

(52) U.S. Cl.
CPC ......... *G05D 1/0027* (2013.01); *G08G 1/0112* (2013.01); *G08G 1/0133* (2013.01);
(Continued)

(58) Field of Classification Search
CPC ......... G05D 1/0027; G05D 2201/0213; G08G 1/0112; G08G 1/0133; G08G 1/096716;
(Continued)

(56) References Cited

U.S. PATENT DOCUMENTS

2013/0145360 A1* 6/2013 Ricci ............... B60W 50/08
717/174
2015/0179062 A1 6/2015 Ralston et al.
(Continued)

FOREIGN PATENT DOCUMENTS

CN 105493083 A 4/2016
CN 105629964 A 6/2016
(Continued)

*Primary Examiner* — Marthe Y Marc-Coleman
(74) *Attorney, Agent, or Firm* — Young Basile Hanlon & MacFarlane, P.C.

(57) ABSTRACT

Methods, apparatuses, systems, and non-transitory computer readable storage media for generating solution data for autonomous vehicles to negotiate problem situations have been disclosed. The disclosed technology generates state data associated with a vehicle using sensor data received from the vehicle and from external objects within a vicinity of the vehicle. The state data includes any of a location of the vehicle, a destination of the vehicle, an operational status of the vehicle, and information associated with a vehicle environment. In response to determining that the state data satisfies a state criterion, a determination of solution profile
(Continued)

data that matches the state data is made on the basis of a comparison of the state data to the solution profile data. Solution data is generated using the matching solution profile data to transmit the solution data to the vehicle for execution.

20 Claims, 9 Drawing Sheets

(51) Int. Cl.
*G08G 1/0967* (2006.01)
*G08G 1/00* (2006.01)
(52) U.S. Cl.
CPC ......... *G08G 1/096716* (2013.01); *G08G 1/20* (2013.01); *G05D 2201/0213* (2013.01)
(58) Field of Classification Search
CPC ...... G08G 1/20; G08G 1/0116; G08G 1/0145; G08G 1/096811; G06Q 10/063112; G01C 21/26
See application file for complete search history.

(56) References Cited

U.S. PATENT DOCUMENTS

| 2015/0254986 | A1 | 9/2015 | Fairfield et al. |
| 2016/0189540 | A1* | 6/2016 | Fowe ............... G08G 1/096741 701/70 |
| 2017/0197617 | A1* | 7/2017 | Penilla .................... H04L 67/12 |

FOREIGN PATENT DOCUMENTS

| JP | 2014016290 A | 1/2014 |
| WO | 2016009600 A1 | 1/2016 |

* cited by examiner

GENERATION OF SOLUTION DATA FOR AUTONOMOUS VEHICLES TO NEGOTIATE PROBLEM SITUATIONS

CROSS-REFERENCE TO RELATED APPLICATION(S)

This application claims priority to and the benefit of U.S. Provisional Application Ser. No. 62/430,900, filed Dec. 6, 2016, the entire disclosure of which is hereby incorporated by reference.

TECHNICAL FIELD

This application generally relates to data processing and more particularly to processing solution data for vehicles including autonomous vehicles.

BACKGROUND

Autonomous vehicles offer human drivers the convenience of efficient conveyance from one location to another without having to direct their attention to the state of the road. However, even the best autonomous vehicle programming cannot account for, and control, all conditions and situations that can arise during operation of the autonomous vehicle. Furthermore, there are times when the autonomous vehicle encounters conditions and situations that might benefit from the assistance of a human operator.

SUMMARY

Disclosed herein are aspects, features, elements, implementations, and implementations for generation of solutions associated with autonomous operation of vehicles.

An aspect of the disclosed implementations includes a method for generating solution data, the method comprising: generating, by a controller apparatus of a remote system, state data associated with a vehicle using sensor data received from the vehicle and from external objects within a vicinity of the vehicle, the state data including any of a location of the vehicle, a destination of the vehicle, an operational state of the vehicle, and information associated with a vehicle environment; in response to determining that the state data satisfies a state criterion, determining, by the controller apparatus, solution profile data that matches the state data based on a comparison of the state data to the solution profile data; and generating, by the controller apparatus, the solution data based on the matching solution profile data to transmit the solution data to the vehicle for execution.

An aspect of the disclosed implementations includes a solution generation apparatus comprising: a memory and a processor configured to execute instructions stored in the memory to: generate state data associated with a vehicle using sensor data received from the vehicle and from external objects within a vicinity of the vehicle, the state data including any of a location of the vehicle, a destination of the vehicle, an operational state of the vehicle, and information associated with a vehicle environment; in response to determining that the state data satisfies a state criterion, determine solution profile data that matches the state data based on a comparison of the state data to the solution profile data; and generate solution data based on the matching solution profile data to transmit the solution data to the vehicle for execution.

An aspect of the disclosed implementations includes a non-transitory computer-readable storage medium including program instructions executable by one or more processors of a controller apparatus that, when executed, cause the one or more processors to perform operations, the operations comprising: generating state data associated with a vehicle using sensor data received from the vehicle and from external objects within a vicinity of the vehicle, the state data including any of a location of the vehicle, a destination of the vehicle, an operational state of the vehicle, and information associated with a vehicle environment; in response to determining that the state data satisfies a state criterion, determining solution profile data that matches the state data based on a comparison of the state data to the solution profile data; and generating the solution data based on the matching solution profile data to transmit the solution data to the vehicle for execution.

These and other aspects of the present disclosure are disclosed in the following detailed description of the embodiments, the appended claims and the accompanying figures.

BRIEF DESCRIPTION OF THE DRAWINGS

The disclosed technology is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
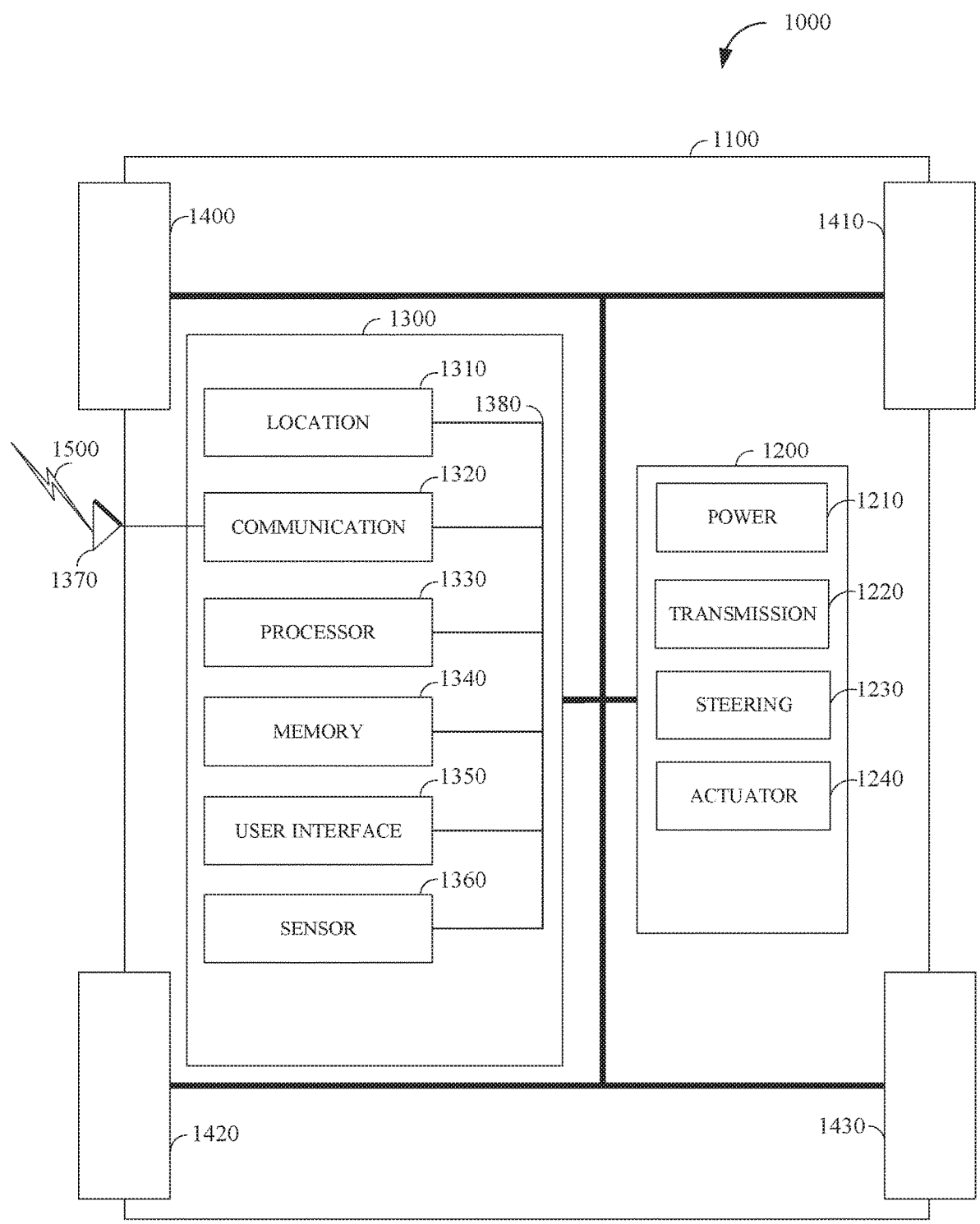
FIG. 1 is a diagram of an example of a portion of a vehicle in which the aspects, features, and elements disclosed herein may be implemented.

The monitoring and operation of vehicles, including autonomous vehicles, can include providing assistance to vehicles that encounter problematic situations. Under some circumstances, the assistance may be provided by an autonomous operator, though in other circumstances, handling problematic situations may be suitably handled by a human operator, including a vehicle manager. For example, when a vehicle encounters an obstruction in a roadway, an autonomous vehicle might not go around the obstruction if doing so means that the autonomous vehicle will travel through an area that is physically safe but is restricted by traffic regulations. Accordingly, a human operator can be tasked with assisting the vehicle in negotiating its problematic situation. However, the determination of the solution to the problematic situation and the assignment of the human operator to manage the problematic situation can be challenging.

The present disclosure and disclosed technology, provides a more effective way to generate solutions associated with the monitoring and operation of vehicles, including autonomous vehicles. The disclosed technology more effectively processes or generates state data associated with the state of a vehicle and a vehicle environment (e.g., the surrounding environment around the vehicle) in order to generate solution data that can assist any of the vehicle, a driver in the vehicle, or a remote operator of the vehicle (e.g., a human or an automated remote operator). The disclosed technology more efficiently assigns solution data to operators, including vehicle managers, in different ways based on data including the operator's familiarity with the location of the autonomous vehicle, the complexity of the solution, and the proficiency of vehicle managers. Further, the disclosed technology efficiently saves solution data for future retrieval, based at least on completion time by respective vehicle managers.

As used herein, the terminology "driver" or "operator" may be used interchangeably. As used herein, the terminology "brake" or "decelerate" may be used interchangeably. As used herein, the terminology "computer" or "computing device" includes any unit, or combination of units, capable of performing any method, or any portion or portions thereof, disclosed herein.

As used herein, the terminology "processor" indicates one or more processors, such as one or more special purpose processors, one or more digital signal processors, one or more microprocessors, one or more controllers, one or more microcontrollers, one or more application processors, one or more Application Specific Integrated Circuits, one or more Application Specific Standard Products; one or more Field Programmable Gate Arrays, any other type or combination of integrated circuits, one or more state machines, or any combination thereof.

As used herein, the terminology "memory" indicates any computer-usable or computer-readable medium or device that can tangibly contain, store, communicate, or transport any signal or information that may be used by or in connection with any processor. For example, a memory may be one or more read only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. In some implementations, instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the terminology "example," "embodiment," "implementation," "aspect," "feature," or "element" indicate serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "determine" and "identify," or any variations thereof, includes selecting, ascertaining, computing, looking up, receiving, determining, establishing, obtaining, or otherwise identifying or determining in any manner whatsoever using one or more of the devices shown and described herein.

As used herein, the terminology "or" is intended to mean an inclusive "or" rather than an exclusive "or." That is, unless specified otherwise, or clear from context, "X includes A or B" is intended to indicate any of the natural inclusive permutations. If X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

Implementations of this disclosure provide technological improvements particular to computer networks and autonomous vehicle management, for example, those concerning the extension of computer network components to generate solutions associated with the operation and monitoring of autonomous vehicles. The development of new ways to generate solution data to, for example, generate solution data to address mechanical and electronic malfunctions in autonomous vehicles, or to overcome the limitations in programming of autonomous vehicles, is fundamentally related to autonomous vehicle related computer networks.

Implementations of this disclosure provide at least a system and method for the generation of solution data and transmission of the solution data to a vehicle or vehicles for execution (i.e., for using the solution data to solve an encountered issue/problem). The systems include a controller apparatus for generating state data for a vehicle using received sensor data. The state data can include any of a location, a destination, and an operational state of the vehicle. For example, the location of the vehicle can be generated based on map data associated with the vehicle that has been received from a global positioning satellite (GPS). In response to determining that the generated state data satisfies a state criterion, a determination of solution profile data that matches the state data is made on the basis of a comparison of the state data to the solution profile data. The solution profile data can be based on solutions from an aggregation of solution data from past events in which assistance was provided to an autonomous vehicle. Solution data can be generated based on the matching solution profile data and subsequently transmitted to the vehicle for execution. For example, the solution data can include a solution to a request for assistance from the driver of an autonomous vehicle.

To describe some implementations in greater detail, reference is made to the following figures.

FIG. 1 is a diagram of an example of a vehicle 1000 in which the aspects, features, and elements disclosed herein may be implemented. The vehicle 1000 includes a chassis 1100, a powertrain 1200, a controller 1300, wheels 1400/1410/1420/1430, or any other element or combination of elements of a vehicle. Although the vehicle 1000 is shown as including four wheels 1400/1410/1420/1430 for simplicity, any other propulsion device or devices, such as a propeller or tread, may be used. In FIG. 1, the lines interconnecting elements, such as the powertrain 1200, the controller 1300, and the wheels 1400/1410/1420/1430, indicate that information, such as data or control signals, power, such as electrical power or torque, or both information and power, may be communicated between the respective elements. For example, the controller 1300 may receive power from the powertrain 1200 and communicate with the powertrain 1200, the wheels 1400/1410/1420/1430, or both, to control the vehicle 1000, which can include accelerating, decelerating, steering, or otherwise controlling the vehicle 1000.

The powertrain 1200 includes a power source 1210, a transmission 1220, a steering unit 1230, a vehicle actuator 1240, or any other element or combination of elements of a powertrain, such as a suspension, a drive shaft, axles, or an exhaust system. Although shown separately, the wheels 1400/1410/1420/1430 may be included in the powertrain 1200.

The power source 1210 may be any device or combination of devices operative to provide energy, such as electrical energy, thermal energy, or kinetic energy. For example, the power source 1210 includes an engine, such as an internal combustion engine, an electric motor, or a combination of an internal combustion engine and an electric motor, and is operative to provide kinetic energy as a motive force to one or more of the wheels 1400/1410/1420/1430. In some embodiments, the power source 1210 includes a potential energy unit, such as one or more dry cell batteries, such as nickel-cadmium (NiCd), nickel-zinc (NiZn), nickel metal hydride (NiMH), lithium-ion (Li-ion); solar cells; fuel cells; or any other device capable of providing energy.

The transmission 1220 receives energy, such as kinetic energy, from the power source 1210, and transmits the energy to the wheels 1400/1410/1420/1430 to provide a motive force. The transmission 1220 may be controlled by the controller 1300, the vehicle actuator 1240 or both. The steering unit 1230 may be controlled by the controller 1300, the vehicle actuator 1240, or both and controls the wheels 1400/1410/1420/1430 to steer the vehicle. The vehicle actuator 1240 may receive signals from the controller 1300 and may actuate or control the power source 1210, the transmission 1220, the steering unit 1230, or any combination thereof to operate the vehicle 1000.

In some embodiments, the controller 1300 includes a location unit 1310, an electronic communication unit 1320, a processor 1330, a memory 1340, a user interface 1350, a sensor 1360, an electronic communication interface 1370, or any combination thereof. Although shown as a single unit, any one or more elements of the controller 1300 may be integrated into any number of separate physical units. For example, the user interface 1350 and processor 1330 may be integrated in a first physical unit and the memory 1340 may be integrated in a second physical unit. Although not shown in FIG. 1, the controller 1300 may include a power source, such as a battery. Although shown as separate elements, the location unit 1310, the electronic communication unit 1320, the processor 1330, the memory 1340, the user interface 1350, the sensor 1360, the electronic communication interface 1370, or any combination thereof can be integrated in one or more electronic units, circuits, or chips.

In some embodiments, the processor 1330 includes any device or combination of devices capable of manipulating or processing a signal or other information now-existing or hereafter developed, including optical processors, quantum processors, molecular processors, or a combination thereof. For example, the processor 1330 may include one or more special purpose processors, one or more digital signal processors, one or more microprocessors, one or more controllers, one or more microcontrollers, one or more integrated circuits, one or more an Application Specific Integrated Circuits, one or more Field Programmable Gate Array, one or more programmable logic arrays, one or more programmable logic controllers, one or more state machines, or any combination thereof. The processor 1330 may be operatively coupled with the location unit 1310, the memory 1340, the electronic communication interface 1370, the electronic communication unit 1320, the user interface 1350, the sensor 1360, the powertrain 1200, or any combination thereof. For example, the processor may be operatively coupled with the memory 1340 via a communication bus 1380.

In some embodiments, the processor 1330 may be configured to execute instructions including instructions for remote operation which may be used to operate the vehicle 1000 from a remote location including the operations center. The instructions for remote operation may be stored in the vehicle 1000 or received from an external source such as a traffic management center, or server computing devices, which may include cloud based server computing devices.

The memory 1340 may include any tangible non-transitory computer-usable or computer-readable medium, capable of, for example, containing, storing, communicating, or transporting machine readable instructions or any information associated therewith, for use by or in connection with the processor 1330. The memory 1340 is, for example, one or more solid state drives, one or more memory cards, one or more removable media, one or more read only memories, one or more random access memories, one or more disks, including a hard disk, a floppy disk, an optical disk, a magnetic or optical card, or any type of non-transitory media suitable for storing electronic information, or any combination thereof.

The electronic communication interface 1370 may be a wireless antenna, as shown, a wired communication port, an optical communication port, or any other wired or wireless unit capable of interfacing with a wired or wireless electronic communication medium 1500.

The electronic communication unit 1320 may be configured to transmit or receive signals via the wired or wireless electronic communication medium 1500, such as via the electronic communication interface 1370. Although not explicitly shown in FIG. 1, the electronic communication unit 1320 is configured to transmit, receive, or both via any wired or wireless communication medium, such as radio frequency (RF), ultra violet (UV), visible light, fiber optic, wire line, or a combination thereof. Although FIG. 1 shows a single one of the electronic communication unit 1320 and a single one of the electronic communication interface 1370, any number of communication units and any number of communication interfaces may be used. In some embodiments, the electronic communication unit 1320 can include a dedicated short range communications (DSRC) unit, a wireless safety unit (WSU), IEEE 802.11p (Wifi-P), or a combination thereof.

The location unit 1310 may determine geolocation information, including but not limited to longitude, latitude, elevation, direction of travel, or speed, of the vehicle 1000. For example, the location unit includes a global positioning system (GPS) unit, such as a Wide Area Augmentation System (WAAS) enabled National Marine-Electronics Association (NMEA) unit, a radio triangulation unit, or a combination thereof. The location unit 1310 can be used to obtain information that represents, for example, a current heading of the vehicle 1000, a current position of the vehicle 1000 in two or three dimensions, a current angular orientation of the vehicle 1000, or a combination thereof.

The user interface 1350 may include any unit capable of being used as an interface by a person, including any of a virtual keypad, a physical keypad, a touchpad, a display, a touchscreen, a speaker, a microphone, a video camera, a sensor, and a printer. The user interface 1350 may be operatively coupled with the processor 1330, as shown, or with any other element of the controller 1300. Although shown as a single unit, the user interface 1350 can include one or more physical units. For example, the user interface 1350 includes an audio interface for performing audio communication with a person, and a touch display for performing visual and touch based communication with the person.

The sensor 1360 may include one or more sensors, such as an array of sensors, which may be operable to provide information that may be used to control the vehicle. The sensor 1360 can provide information regarding current operating characteristics of the vehicle or its surrounding. The sensors 1360 include, for example, a speed sensor, acceleration sensors, a steering angle sensor, traction-related sensors, braking-related sensors, or any sensor, or combination of sensors, that is operable to report information regarding some aspect of the current dynamic situation of the vehicle 1000.

In some embodiments, the sensor 1360 may include sensors that are operable to obtain information regarding the physical environment surrounding the vehicle 1000. For example, one or more sensors detect road geometry and obstacles, such as fixed obstacles, vehicles, cyclists, and pedestrians. In some embodiments, the sensor 1360 can be or include one or more video cameras, laser-sensing systems, infrared-sensing systems, acoustic-sensing systems, or any other suitable type of on-vehicle environmental sensing device, or combination of devices, now known or later developed. In some embodiments, the sensor 1360 and the location unit 1310 are combined.

Although not shown separately, the vehicle 1000 may include a trajectory controller. For example, the controller 1300 may include a trajectory controller. The trajectory controller may be operable to obtain information describing a current state of the vehicle 1000 and a route planned for the vehicle 1000, and, based on this information, to determine and optimize a trajectory for the vehicle 1000. In some embodiments, the trajectory controller outputs signals operable to control the vehicle 1000 such that the vehicle 1000 follows the trajectory that is determined by the trajectory controller. For example, the output of the trajectory controller can be an optimized trajectory that may be supplied to the powertrain 1200, the wheels 1400/1410/1420/1430, or both. In some embodiments, the optimized trajectory can be control inputs such as a set of steering angles, with each steering angle corresponding to a point in time or a position. In some embodiments, the optimized trajectory can be one or more paths, lines, curves, or a combination thereof.

One or more of the wheels 1400/1410/1420/1430 may be a steered wheel, which is pivoted to a steering angle under control of the steering unit 1230, a propelled wheel, which is torqued to propel the vehicle 1000 under control of the transmission 1220, or a steered and propelled wheel that steers and propels the vehicle 1000.

A vehicle may include units, or elements not shown in FIG. 1, such as an enclosure, a Bluetooth® module, a frequency modulated (FM) radio unit, a Near Field Communication (NFC) module, a liquid crystal display (LCD) display unit, an organic light-emitting diode (OLED) display unit, a speaker, or any combination thereof.

Figure 2:
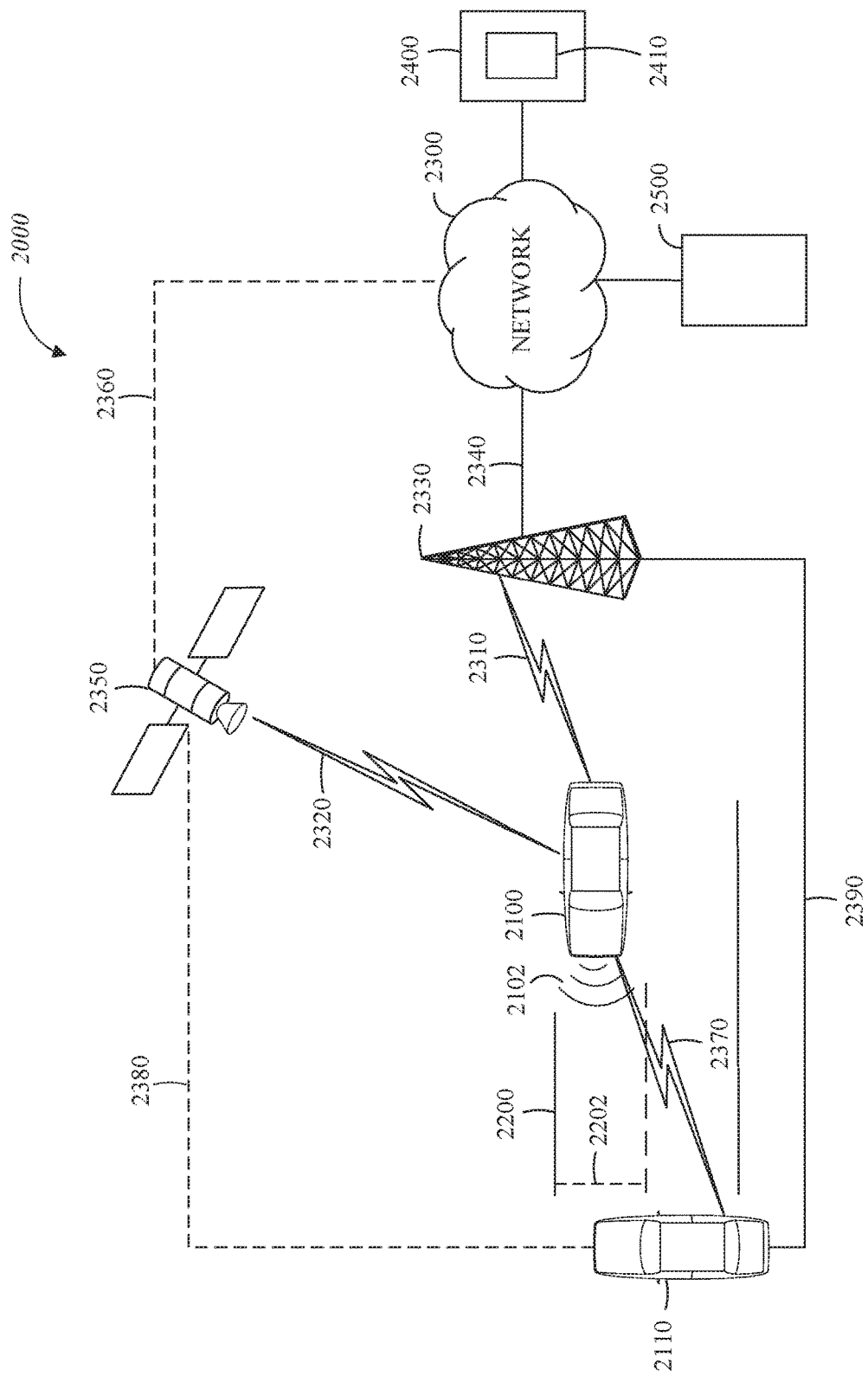
FIG. 2 is a diagram of an example of a portion of a vehicle transportation and communication system in which the aspects, features, and elements disclosed herein may be implemented.

FIG. 2 is a diagram of an example of a portion of a vehicle transportation and communication system 2000 in which the aspects, features, and elements disclosed herein may be implemented. The vehicle transportation and communication system 2000 includes a vehicle 2100, such as the vehicle 1000 shown in FIG. 1, and one or more external objects, such as an external object 2110, which can include any form of transportation, such as the vehicle 1000 shown in FIG. 1, a pedestrian, cyclist, as well as any form of a structure, such as a building. The vehicle 2100 may travel via one or more portions of a transportation network 2200, and may communicate with the external object 2110 via one or more of an electronic communication network 2300. Although not explicitly shown in FIG. 2, a vehicle may traverse an area that is not expressly or completely included in a transportation network, such as an off-road area. In some embodiments the transportation network 2200 may include one or more of a vehicle detection sensor 2202, such as an inductive loop sensor, which may be used to detect the movement of vehicles on the transportation network 2200.

The electronic communication network 2300 may be a multiple access system that provides for communication, such as voice communication, data communication, video communication, messaging communication, or a combination thereof, between the vehicle 2100, the external object 2110, and an operations center 2400. For example, the vehicle 2100 or the external object 2110 may receive information, such as information representing the transportation network 2200, from the operations center 2400 via the electronic communication network 2300.

The operations center 2400 includes a controller apparatus 2410 which includes some or all of the features of the controller 1300 shown in FIG. 1. The controller apparatus 2410 can monitor and coordinate the movement of vehicles, including autonomous vehicles. The controller apparatus 2410 may monitor the state or condition of vehicles, such as the vehicle 2100, and external objects, such as the external object 2110. The controller apparatus 2410 can receive vehicle data and infrastructure data including any of: vehicle velocity; vehicle location; vehicle operational state; vehicle destination; vehicle route; vehicle sensor data; external object velocity; external object location; external object operational state; external object destination; external object route; and external object sensor data.

Further, the controller apparatus 2410 can establish remote control over one or more vehicles, such as the vehicle 2100, or external objects, such as the external object 2110. In this way, the controller apparatus 2410 may teleoperate the vehicles or external objects from a remote location. The controller apparatus 2410 may exchange (send or receive) state data with vehicles, external objects, or computing devices such as the vehicle 2100, the external object 2110, or a server computing device 2500, via a wireless communication link such as the wireless communication link 2380 or a wired communication link such as the wired communication link 2390.

The server computing device 2500 may include one or more server computing devices which may exchange (send or receive) state signal data with one or more vehicles or computing devices including the vehicle 2100, the external object 2110, or the operations center 2400, via the electronic communication network 2300.

In some embodiments, the vehicle 2100 or the external object 2110 communicates via the wired communication link 2390, a wireless communication link 2310/2320/2370, or a combination of any number or types of wired or wireless communication links. For example, as shown, the vehicle 2100 or the external object 2110 communicates via a terrestrial wireless communication link 2310, via a non-terrestrial wireless communication link 2320, or via a combination thereof. In some implementations, a terrestrial wireless communication link 2310 includes an Ethernet link, a serial link, a Bluetooth link, an infrared (IR) link, an ultraviolet (UV) link, or any link capable of providing for electronic communication.

A vehicle, such as the vehicle 2100, or an external object, such as the external object 2110 may communicate with another vehicle, external object, or the operations center 2400. For example, a host, or subject, vehicle 2100 may receive one or more automated inter-vehicle messages, such as a basic safety message (BSM), from the operations center 2400, via a direct communication link 2370, or via an electronic communication network 2300. For example, operations center 2400 may broadcast the message to host vehicles within a defined broadcast range, such as three hundred meters, or to a defined geographical area. In some embodiments, the vehicle 2100 receives a message via a third party, such as a signal repeater (not shown) or another remote vehicle (not shown). In some embodiments, the vehicle 2100 or the external object 2110 transmits one or more automated inter-vehicle messages periodically based on a defined interval, such as one hundred milliseconds.

Automated inter-vehicle messages may include vehicle identification information, geospatial state information, such as longitude, latitude, or elevation information, geospatial location accuracy information, kinematic state information, such as vehicle acceleration information, yaw rate information, speed information, vehicle heading information, braking system state data, throttle information, steering wheel angle information, or vehicle routing information, or vehicle operating state information, such as vehicle size information, headlight state information, turn signal information, wiper state data, transmission information, or any other information, or combination of information, relevant to the transmitting vehicle state. For example, transmission state information indicates whether the transmission of the transmitting vehicle is in a neutral state, a parked state, a forward state, or a reverse state.

In some embodiments, the vehicle 2100 communicates with the electronic communication network 2300 via an access point 2330. The access point 2330, which may include a computing device, may be configured to communicate with the vehicle 2100, with the electronic communication network 2300, with the operations center 2400, or with a combination thereof via wired or wireless communication links 2310/2340. For example, an access point 2330 is a base station, a base transceiver station (BTS), a Node-B, an enhanced Node-B (eNode-B), a Home Node-B (HNode-B), a wireless router, a wired router, a hub, a relay, a switch, or any similar wired or wireless device. Although shown as a single unit, an access point can include any number of interconnected elements.

The vehicle 2100 may communicate with the electronic communication network 2300 via a satellite 2350, or other non-terrestrial communication device. The satellite 2350, which may include a computing device, may be configured to communicate with the vehicle 2100, with the electronic communication network 2300, with the operations center 2400, or with a combination thereof via one or more communication links 2320/2360. Although shown as a single unit, a satellite can include any number of interconnected elements.

The electronic communication network 2300 may be any type of network configured to provide for voice, data, or any other type of electronic communication. For example, the electronic communication network 2300 includes a local area network (LAN), a wide area network (WAN), a virtual private network (VPN), a mobile or cellular telephone network, the Internet, or any other electronic communication system. The electronic communication network 2300 may use a communication protocol, such as the transmission control protocol (TCP), the user datagram protocol (UDP), the internet protocol (IP), the real-time transport protocol (RTP) the Hyper Text Transport Protocol (HTTP), or a combination thereof. Although shown as a single unit, an electronic communication network can include any number of interconnected elements.

In some embodiments, the vehicle 2100 communicates with the operations center 2400 via the electronic communication network 2300, access point 2330, or satellite 2350. The operations center 2400 may include one or more computing devices, which are able to exchange (send or receive) data from: vehicles such as the vehicle 2100; external objects including the external object 2110; or computing devices such as the server computing device 2500.

In some embodiments, the vehicle 2100 identifies a portion or condition of the transportation network 2200. For example, the vehicle 2100 may include one or more on-vehicle sensors 2102, such as the sensor 1360 shown in FIG. 1, which includes a speed sensor, a wheel speed sensor, a camera, a gyroscope, an optical sensor, a laser sensor, a radar sensor, a sonic sensor, or any other sensor or device or combination thereof capable of determining or identifying a portion or condition of the transportation network 2200.

The vehicle 2100 may traverse one or more portions of the transportation network 2200 using information communicated via the electronic communication network 2300, such as information representing the transportation network 2200, information identified by one or more on-vehicle sensors 2102, or a combination thereof. The external object 2110 may be capable of all or some of the communications and actions described above with respect to the vehicle 2100.

For simplicity, FIG. 2 shows the vehicle 2100 as the host vehicle, the external object 2110, the transportation network 2200, the electronic communication network 2300, and the operations center 2400. However, any number of vehicles, networks, or computing devices may be used. In some embodiments, the vehicle transportation and communication system 2000 includes devices, units, or elements not shown in FIG. 2. Although the vehicle 2100 or external object 2110 is shown as a single unit, a vehicle can include any number of interconnected elements.

Although the vehicle 2100 is shown communicating with the operations center 2400 via the electronic communication network 2300, the vehicle 2100 (and external object 2110) may communicate with the operations center 2400 via any number of direct or indirect communication links. For example, the vehicle 2100 or external object 2110 may communicate with the operations center 2400 via a direct communication link, such as a Bluetooth communication link. Although, for simplicity, FIG. 2 shows one of the transportation network 2200, and one of the electronic communication network 2300, any number of networks or communication devices may be used.

Figure 3:
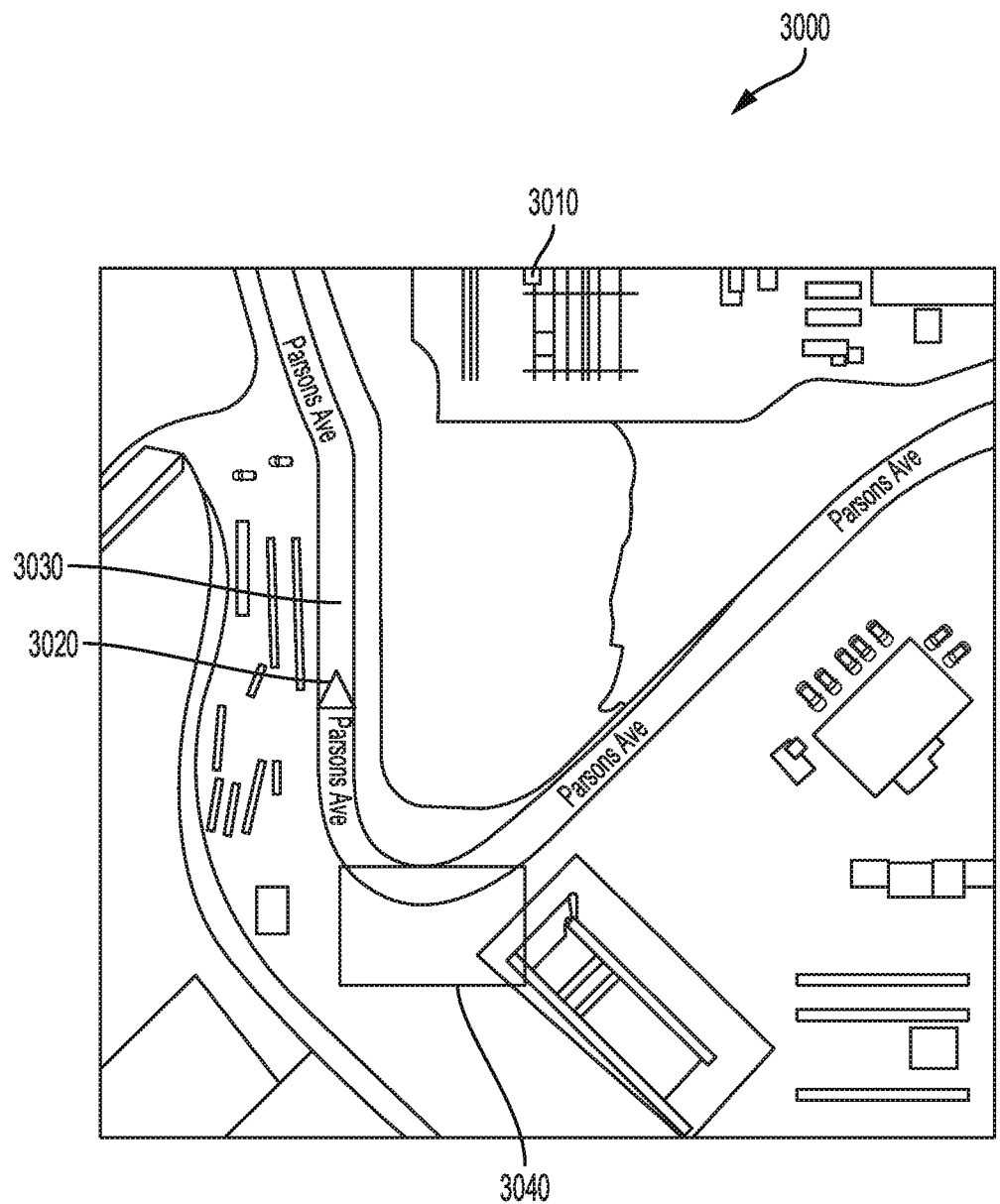
FIG. 3 is a diagram illustrating an example of a solution generation interface in accordance with the present disclosure.

FIG. 3 is a diagram illustrating an example of a solution generation interface 3000. The solution generation interface 3000 can be generated based on one or more instructions that are executable on a computing apparatus, including the controller apparatus 2410 shown in FIG. 2, and which can be stored in a memory of a computing apparatus, including the controller apparatus 2410. For example, the solution generation interface 3000 can be generated by the controller apparatus 2410, based on instructions that are interpreted by a client computing device that accesses the controller apparatus 2410 through a computer network. The client computing device can then generate a representation of the solution generation interface 3000 on a display device.

The controller apparatus 2410 can include a plurality of components or modules including but not limited to a solution generation module and an electronic communication system (e.g., the electronic communication unit 1320 of FIG. 1). The solution generation module can also be referred to as a solution generation apparatus. The solution generation apparatus can generate the solution data (also referred to as instruction data) for transmission to the vehicle for execution or for remote execution by a remote operator (e.g., tele-operator) of the vehicle. The solution data can be displayed via a graphical user interface (e.g., the solution generation interface 3000 of FIG. 3) to enable a driver of the vehicle to be in communication with the remote operator and/or to provide feedback on the proposed solution data received. The solution generation interface 3000 can also be utilized by the remote operator to ensure accurate solution data is generated based on varying conditions.

In an implementation, the solution generation interface 3000 includes a representation of objects that are being monitored or tracked on the environment portion 3010. The representation of objects can be displayed via the solution generation interface 3000 subsequent to generation by the controller apparatus in response to receiving data and information (e.g., sensor data) associated with the objects. The environment portion 3010 generates or displays: a vehicle indicator 3020, a roadway portion indicator 3030, and a work-zone indicator 3040.

The environment portion 3010 includes a representation of a plurality of objects, including the vehicle indicator 3020 and the roadway portion indicator 3030. The representation of the plurality of objects can be based on data relating to the state or condition (e.g., appearance, direction of movement, identity) of actual objects within an actual geographical area. For example, the objects can include vehicles, including the vehicle 2100 shown in FIG. 2.

The vehicle and the objects can be represented as indicators such as the vehicle indicator 3020, which can be generated as a variety of images including but not limited to static images, dynamic images, moving images, a real-time stream of images or video, or any combination thereof. Further the features and characteristics of objects within the geographical area represented by the environment portion 3010 can be based on the actual appearance of the objects that can be obtained or received from remote data sources or sensors (e.g., satellite images, vehicle sensor images, traffic signal camera images). Moreover, objects can be represented in the environment portion 3010 as images including indicators or other symbolic representations including icons, text, pictograms, or any combination thereof.

The environment portion 3010 can receive input including any of touch inputs (e.g., touching a touch screen such as a capacitive display), voice inputs (e.g., speaking into a microphone), and inputs from an input device (e.g., keyboard or stylus). Based on the input, the environment portion 3010 can modify the way that images within the environment portion 3010 appear including but not limited to: magnification of some or all of the images (e.g., increasing the size of a subset of the plurality of objects or zooming into the area that is displayed within the environment portion 3010); shrinking some or all of the objects, including zooming out from the area that is represented; changing the viewing angle, including changing to an overhead view (e.g., map view). In this way, an interaction with a portion of the environment portion 3010 can result in the display of additional data related to anything displayed on the environment portion 3010 including, for example, the objects.

As illustrated in FIG. 3, the vehicle corresponding to the vehicle indicator 3020 is on a portion of the roadway represented by the roadway portion indicator 3030. In this example, the passenger in the vehicle corresponding to the vehicle indicator 3020 is in communication with an operator, such as a vehicle manager, regarding the safety of traversing the roadway represented by the roadway portion indicator 3030. The vehicle manager can use a computing apparatus, including the controller apparatus 2410, which can retrieve and process sensor or state data associated with the vehicle, to generate (and transmit back to the vehicle) solution data based on the state data from the vehicle. The state data of the vehicle can include map data associated with the area represented in environment portion 3010, and state data associated with the location of the vehicle represented by the vehicle indicator 3020.

The generated solution data can include the work-zone indicator 3040, which indicates that the area represented by the work-zone indicator 3040 is an operational work-zone with heavy machinery that extends onto the roadway represented by the roadway portion indicator 3030. Based on the solution data, the vehicle should avoid the portion of the roadway represented by the work-zone indicator 3040. Accordingly, the vehicle manager can use the solution data to assist the driver of the vehicle represented by the vehicle indicator 3020 in avoiding the work-zone.

Figure 4:
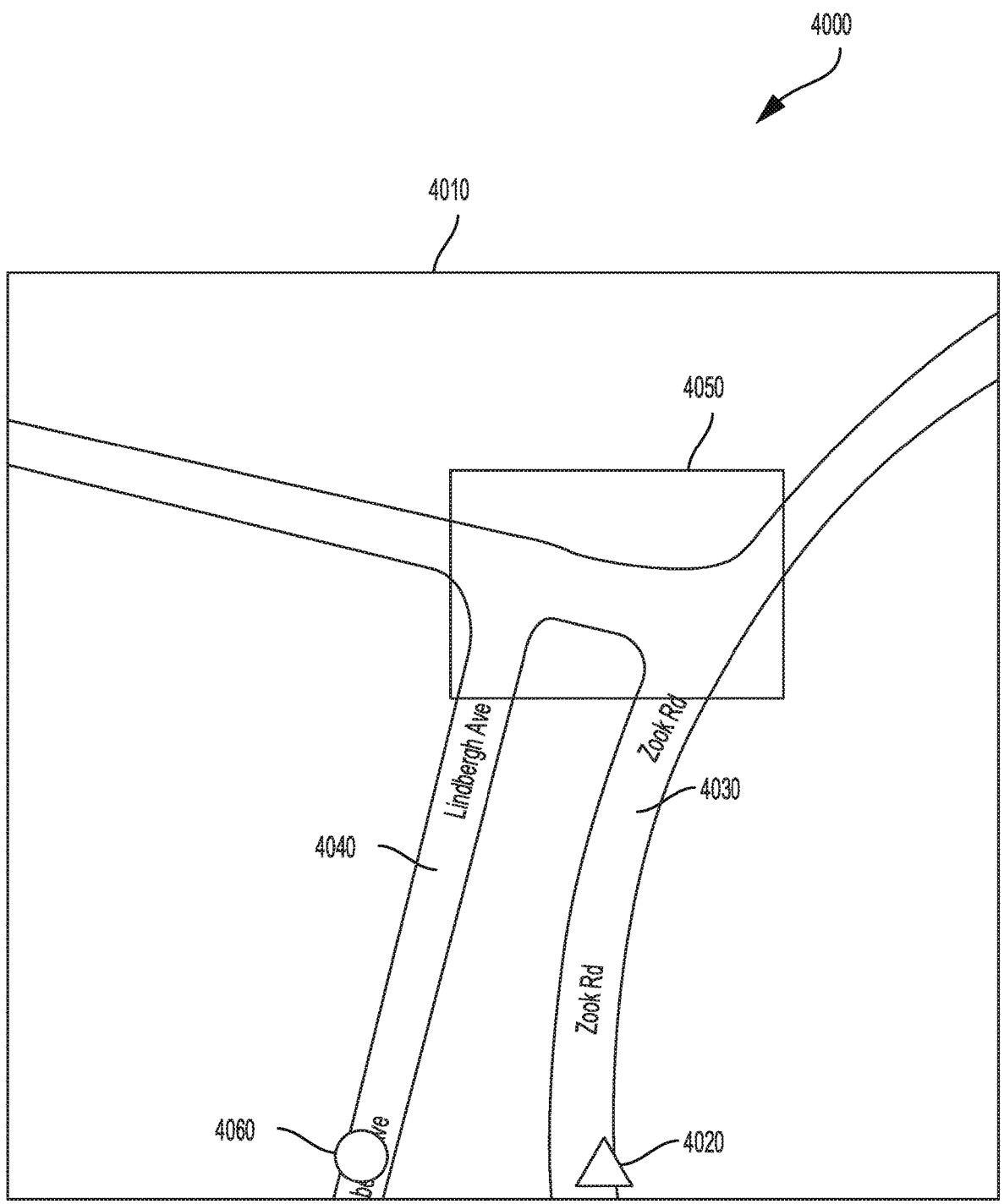
FIG. 4 is a diagram illustrating an example of a solution generation interface in accordance with the present disclosure.

FIG. 4 is a diagram illustrating an example of a solution generation interface 4000. The solution generation interface 4000 can be generated based on one or more instructions that are executable on a computing apparatus, including the controller apparatus 2410 shown in FIG. 2, and which can be stored in a memory of a computing apparatus, including the controller apparatus 2410. For example, the solution generation interface 4000 can be generated by the controller apparatus 2410, based on instructions that are interpreted by a client computing device that accesses the controller apparatus 2410 through a computer network. The client computing device can then generate a representation of the solution generation interface 4000 on a display device.

The controller apparatus 2410 can include a plurality of components or modules including but not limited to a solution generation module and an electronic communication system (e.g., the electronic communication unit 1320 of FIG. 1). The solution generation module can also be referred to as a solution generation apparatus. The solution generation apparatus can generate the solution data (also referred to as instruction data) for transmission to the vehicle for execution or for remote execution by a remote operator (e.g., tele-operator) of the vehicle. The solution data can be displayed via a graphical user interface (e.g., the solution generation interface 4000 of FIG. 4) to enable a driver of the vehicle to be in communication with the remote operator and/or to provide feedback on the proposed solution data received. The solution generation interface 3000 can also be utilized by the remote operator to ensure accurate solution data is generated based on varying conditions.

In an implementation, the solution generation interface 4000 includes a representation of objects that are being monitored or tracked on the environment portion 4010. The environment portion 4010, which represents a geographic area, generates or displays: a vehicle indicator 4020 which represents a vehicle, roadway portion indicators 4030/4040 which represent roadways, unmapped pathway indicator 4050 which represents an indicator of the area around a roadway that is not mapped, and vehicle destination indicator 4060 which represents a destination of the vehicle represented by the vehicle indicator 4020.

The environment portion 4010 includes a representation of objects, including the vehicle indicator 4020 and the roadway portion indicators 4030/4040. The representation of the objects can be based on data relating to the state or condition (e.g., appearance, direction of movement, identity) of actual objects within an actual geographical area. For example, the objects can include vehicles, including the vehicle 2100 shown in FIG. 2.

The vehicle and the objects can be represented as indicators such as the vehicle indicator 4020, and the roadway portion indicators 4030/4040, which can be generated as a variety of images including but not limited to static images, dynamic images, moving images, a real-time stream of images or video, or any combination thereof. Further the features and characteristics of objects within the geographical area represented by the environment portion 4010 can be based on the actual appearance of the objects that can be obtained or received from remote data sources or sensors (e.g., satellite images, vehicle sensor images, traffic signal camera images). Moreover, objects can be represented in the environment portion 4010 as images including indicators or other symbolic representations including icons, text, pictograms, or any combination thereof.

The environment portion 4010 can receive input including any of touch inputs (e.g., touching a touch screen such as a capacitive display), voice inputs (e.g., speaking into a microphone), and inputs from an input device (e.g., keyboard or stylus). Based on the input, the environment portion 4010 can modify the way that images within the environment portion 4010 appear including but not limited to: magnification of some or all of the images (e.g., increasing the size of a subset of the plurality of objects or zooming into the area that is displayed within the environment portion 4010); shrinking some or all of the objects, including zooming out from the area that is represented; changing the viewing angle, including changing to an overhead view (e.g., map view). In this way, an interaction with a portion of the environment portion 4010 can result in the display of additional data related to anything displayed on the environment portion 4010 including, for example, the objects.

As illustrated in FIG. 4, the vehicle represented by the vehicle indicator 4020 is on a portion of the roadway indicator 4030. The driver of the vehicle represented by the vehicle indicator 4020 is in communication with a vehicle manager and indicates that he seeks to travel to a destination represented by the vehicle destination indicator 4060. The view from the vehicle does not allow the driver to see the unmapped portion of the roadway represented by the unmapped pathway indicator 4050 which represents an unmapped road that is not visible from the roadway represented by the roadway indicator 4030. The vehicle manager can a computing apparatus, including the controller apparatus 2410, retrieve (e.g., from a remote device including a remote server device or cloud computing device) and process state data of the vehicle and to generate solution data based on the state data from the vehicle. The state data of the vehicle can include data associated with the location of the vehicle and objects within a predetermined distance of the vehicle. Based on the location of the vehicle, the computing apparatus can generate solution data indicating the unmapped pathway indicator 4050 which can be used to assist the driver in travelling to the destination represented by the vehicle destination indicator 4060.

Figure 5:
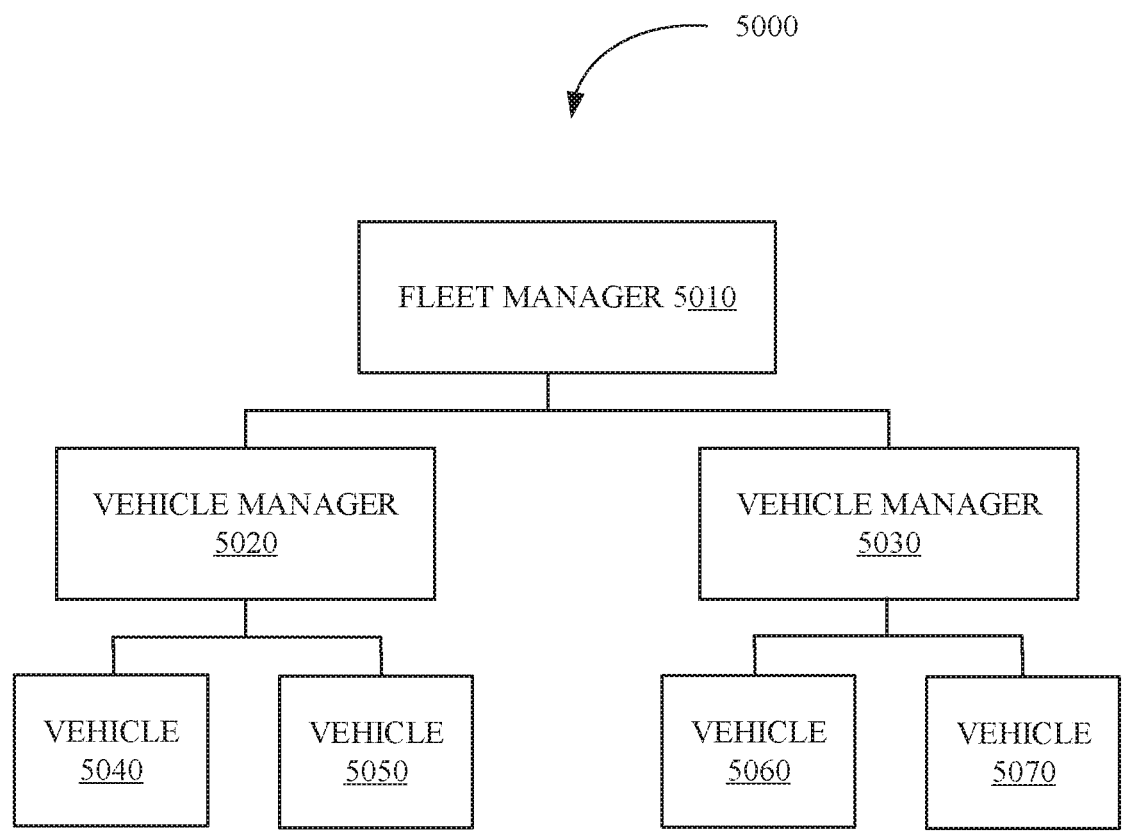
FIG. 5 is a block diagram illustrating a remote vehicle assistance center in accordance with the present disclosure.

FIG. 5 is a block diagram illustrating a remote vehicle assistance center 5000 according to this disclosure. The remote vehicle assistance center 5000 can also be referred to as a remote system. The remote vehicle assistance center 5000 includes a fleet manager 5010, a plurality of vehicle managers including but not limited to a vehicle manager 5020 and a vehicle manager 5030, and a plurality of vehicles including but not limited to vehicles 5040, 5050, 5060, and 5070.

The fleet manager 5010 can include an apparatus including some or all of the features of the controller 1300 shown in FIG. 1 or the controller apparatus 2410 of FIG. 2. The fleet manager 5010 can monitor and coordinate vehicle managers, including the vehicle managers 5020/5030 as well as the movement of vehicles, including autonomous vehicles, and the vehicles 5040/5050/5060/5070. Monitoring and coordinating the vehicle managers can include any of: assigning, allocating, or deallocating, vehicles to the vehicle managers; reviewing and monitoring performance data of the vehicle managers; and assigning vehicle managers to a geographic area. In an implementation, there can be multiple fleet managers, who may in turn be managed or under the authority of other fleet managers.

The vehicle manager 5020 can monitor the state or condition of vehicles, including the vehicle 5040 and the vehicle 5050. As illustrated in FIG. 5, the vehicle manager 5020 has been assigned vehicle 5040 and vehicle 5050. The assignment of vehicles to a vehicle manager can be performed by a fleet manager such as the fleet manager 5010.

The vehicle manager 5030 can monitor the state or condition of vehicles, including the vehicle 5060 and the vehicle 5070. As illustrated in FIG. 5, the vehicle manager 5030 has been assigned vehicle 5060 and vehicle 5070. The assignment of vehicles to a vehicle manager can be performed by a fleet manager such as the fleet manager 5010. The assignment of vehicles to a vehicle manager can also be automated using machine learning techniques.

In an implementation, the vehicle managers can cluster or group the vehicles, establish communication with occupants in the vehicle, remotely operate the vehicles, and coordinate the movement of the vehicles through a transportation network or around various obstacles such as traffic congestion. The vehicle managers can interact with other vehicle managers to aid in the monitoring and management of the vehicles.

The vehicles including the vehicle 5040/5050/5060/5070 comprise vehicles such as the vehicle 2100 as shown in FIG. 2, that are being monitored or coordinated by the fleet manager 5010. The vehicles can be operated autonomously or by a human driver and can exchange (send and receive) vehicle data relating to the state or condition of the vehicle and its surroundings including any of: vehicle velocity; vehicle location; vehicle operational state; vehicle destination; vehicle route; vehicle sensor data; external object velocity; and external object location.

The steps, or operations, of any method, process, or algorithm described in connection with the implementations of the disclosed technology herein, may be implemented in hardware, firmware, software executed by hardware, circuitry, or any combination thereof. To facilitate explanation, the processes 6000-9000, shown in FIGS. 6-9, are depicted and described as a series of operations. However, the operations in accordance with this disclosure can occur in various orders or concurrently. Additionally, operations in accordance with this disclosure may occur with other operations not presented and described herein.

Figure 6:
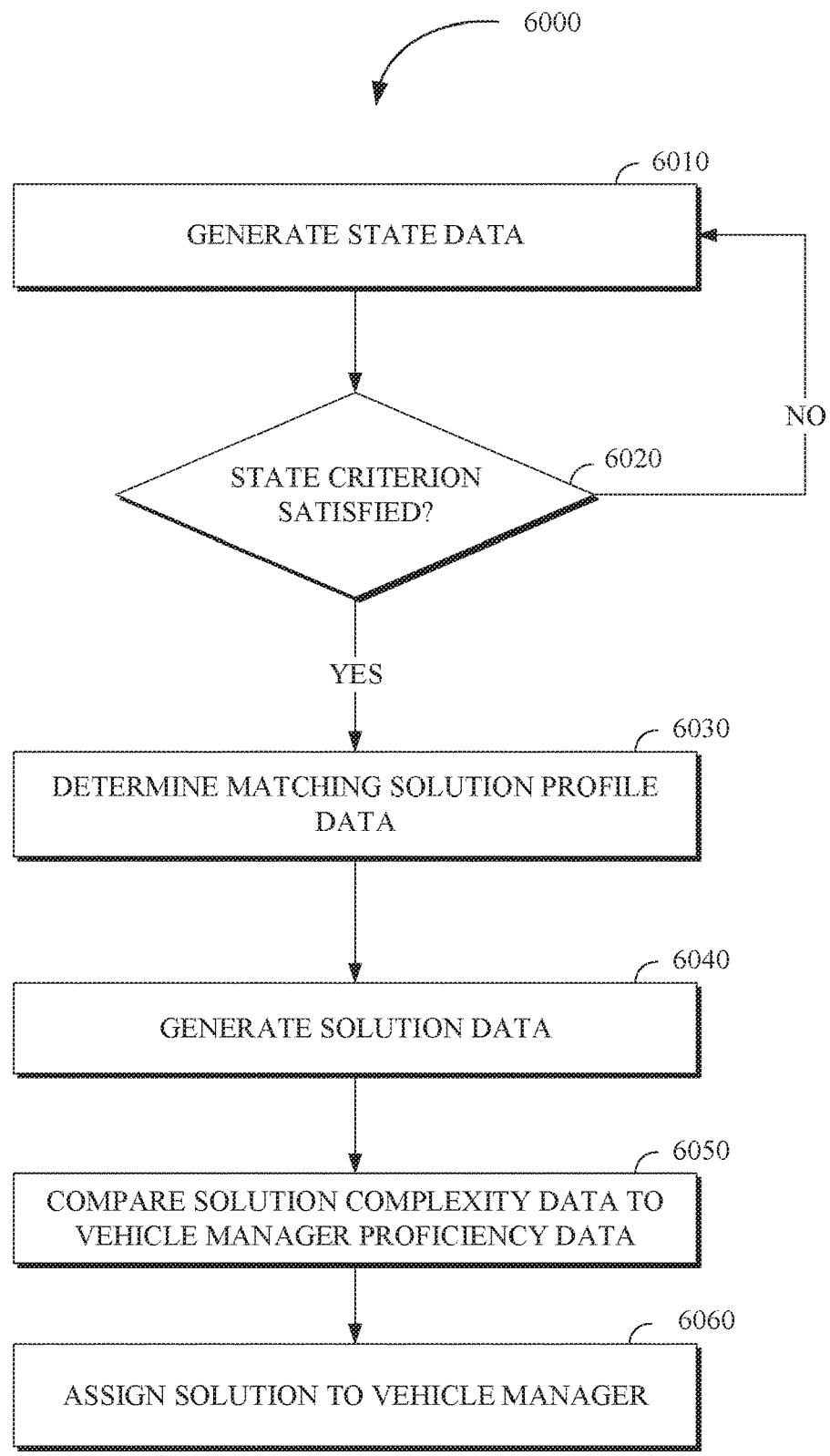
FIG. 6 is a block diagram illustrating a technique for autonomous vehicle solution generation in accordance with the present disclosure.

FIG. 6 is a flow chart of a technique 6000 for solution generation in accordance with the present disclosure. The technique 6000 is utilized by a solution generation system that includes at least one fleet manager, vehicle manager, and the aforementioned interfaces. Some or all of the technique 6000 for solution generation may be implemented in a vehicle including the vehicle 1000 shown in FIG. 1, the vehicle 2100 shown in FIG. 2, or a computing apparatus including a controller apparatus such as the controller apparatus 2410 shown in FIG. 2. The controller apparatus can include a solution generation module or the controller apparatus can comprise a solution generation module. In an implementation, some or all aspects of the technique 6000 for solution generation can be implemented in a system (e.g., the controller apparatus 2410 of FIG. 2) combining some or all of the features described in this disclosure.

At operation 6010, state data for a vehicle is generated. The vehicle can include a device or apparatus (e.g., a conveyance) that is used to transport objects including any of one or more passengers and cargo. Further, the vehicle can include a communication system to exchange (send or receive) signals including data (e.g., vehicle route data associated with the route of a vehicle). The vehicle can include any of an autonomous vehicle, a vehicle that is driven by a human driver, and a semi-autonomous vehicle.

The state data can be associated with the condition or state of the vehicle and surroundings of the vehicle (e.g., an area within a predetermined distance of the vehicle) and can include, but is not limited to properties or attributes of: kinetic data relating to any of the velocity and acceleration of a vehicle; location data, including a location of the vehicle such as the geographical location of the vehicle (e.g., the latitude and longitude of the vehicle), the location of the vehicle with respect to another object, or the location of the vehicle with respect to a type of area (e.g., school zone, fire lane, parking lot); vehicle position data, including the orientation and inclination (e.g., slope of the vehicle on an incline) of the vehicle; operational data relating to the operational state of the vehicle, including the electrical state or mechanical state of the vehicle (e.g., health of the electrical vehicle systems, mechanical vehicle systems, tire pressure, etc.); maintenance data associated with ongoing maintenance of the vehicle including scheduled tune-ups; vehicle energy state data, including an amount of fuel remaining or an amount of battery charge remaining; sensor data including vehicle sensor data based on outputs from sensors including, optical sensors (e.g., light detection and ranging sensors), audio sensors, and motion sensors, the sensor data can be used to generate a representation of the physical environment in and around the vehicle; internal state data, including a temperature and humidity inside the passenger cabin of the vehicle; current task data associated with a current task (e.g., drop off a passenger) of the vehicle including an estimated time for completion of the current task; destination data associated with a destination of the vehicle, including one or more routes that the vehicle can traverse to arrive at the destination; vehicle stoppage data associated with the stoppage of other vehicles (e.g., other vehicles stopped in a roadway); construction activity data associated with construction activity and the location of construction zones; lane direction data including data associated with the regulated traffic flow direction in the lane of a roadway; lane closure data associated with data relating to the closure of lanes including closure of roads; road surface condition data associated with the type (e.g., paved road, unpaved road) and condition (e.g., slippery due to ice) of road surfaces; and pedestrian activity data.

At operation 6020, a determination of whether the state data satisfies a state criterion is made. The state criterion can be based on a property or attribute of the state data. Further, the state criterion can be based on a state or condition of the vehicle that corresponds to any of: the operation of the vehicle (e.g., the vehicle has experienced engine failure, a flat tire, or has an empty fuel tank); the state of the environment surrounding the vehicle (e.g., an environment external to the vehicle) including inanimate and immoveable portions of the environment (e.g., a broken roadway or an obstruction, such as a concrete road barrier, that impedes passage of the vehicle), inanimate and moveable portions of the environment (e.g., other vehicles), and animate portions of the environment (e.g., pedestrians, cyclists); and one or more of the passengers of the vehicle (e.g., a passenger is experiencing physical problems that would benefit from medical care).

The determination that the state data satisfies the state criterion can be based on whether the value of one of the properties or attributes of the state data that equals a state threshold value, exceeds a state threshold value, or is less than a state threshold value. Further, satisfaction of the state criterion can be based on the evaluation of more than one of the properties or attributes of the state data. For example, satisfying the state criterion can include a state criterion for travel of the vehicle to a destination within an estimated amount of time (e.g., the vehicle is scheduled to arrive at an airport within thirty minutes). The sensor data of the state data can indicate that the main roadway on the shortest path to the airport is obstructed due to a fallen tree and that waiting for the fallen tree to be removed would result in the estimated arrival time at the airport exceeding the estimated amount of time by two hours. The state criterion could have a tardiness threshold of ten percent of the estimated amount of time of thirty minutes (three minutes) which is exceeded by the estimated time of two hours before the obstruction is removed from the roadway. Accordingly, the state criterion would be satisfied by exceeding the tardiness threshold.

In response to determining that the state data satisfies the state criterion, the technique 6000 proceeds to operation 6030. In response to determining that the state data does not satisfy the state criterion, the technique 6000 returns to operation 6010.

At operation 6030, a determination of whether solution profile data matches the state data is made. The determination of the solution profile data that matches the state data can be based on a comparison of the state data to the solution profile data.

The solution profile data, which can be associated with the state data including properties or attributes of the state data. The solution profile data is based on solutions (e.g., ways to resolve an event, including an irregular event, that is associated with the vehicle) to any type of event (e.g., an event that is outside of regular vehicle operational conditions including but not limited to any of reductions in vehicle performance, an adverse effect on a vehicle passenger, and adverse environmental conditions) and can include any of: operational solutions associated with the operational state of the vehicle including establishing communications to provide assistance (e.g., roadside assistance can be called to assist with a flat tire or vehicle battery failure), activating or deactivating a vehicle control system of the vehicle (e.g., a hazard signal light of the vehicle); pathfinding solutions to direct the movement of the vehicle from one location to another location (e.g., navigating the vehicle around an obstruction); passenger solutions associated with improving the condition of a vehicle passenger; environmental solutions associated with conditions in the environment including any of pedestrian activity (e.g., large groups of people), vehicle activity (e.g., vehicular traffic), weather conditions (e.g., rain, snow), natural hazards (e.g., flooding, fire), roadway conditions (e.g., traffic stoppages, lane restrictions, road restrictions, construction activity, adverse road surfaces).

Matching the state data to the solution profile data can include any of an approximate match and an exact match of any of data, data properties, and data values of the respective state data and solution profile data. An exact match can include a match between any of corresponding data properties and values in the state data and the profile data. For example, an exact match between the state data and the solution profile data can include matching fuel state data of the state data (e.g., the amount of fuel in the vehicle) which indicates a value of zero (to indicate the fuel tank is empty) to corresponding fuel state solution data with a value of zero which indicates a solution for when the value of the fuel state data of the state data is zero.

An approximate match can include a match between any of data, data properties, and data values in the state data that are within a predetermined range (e.g., an absolute value or a proportional value) of data, data properties, and data values in the solution profile data. For example, if the state data includes fuel state data that includes a value of five (to denote that the fuel tank is five percent full) the fuel state solution data that corresponds to the fuel state data can be matched based on a range of zero to ten (indicating that the fuel tank can be zero to ten percent full in order to match the fuel state profile of the solution profile data).

At operation 6040, solution data is generated. The solution data can be generated based on the solution profile data and can include a particularized way to apply the solution data to any of a vehicle (e.g., an autonomous vehicle) and a passenger in a vehicle. For example, identity data associated with the identity of a vehicle passenger can be retrieved and the solution data can be adapted based on data relating to the vehicle passenger's past experience with the vehicle. Further, the solution data can be output to an output device including display devices (e.g., monitors), audio output devices (e.g., loudspeakers), and haptic output devices (e.g., haptic output through a steering wheel or other portion of the vehicle).

The solution data can be represented in a solution interface, including for example, the solution generation interface 3000 illustrated in FIG. 3, which can be implemented in an output device. Furthermore, the solution data can be generated based on access to real-time data sources, which can be used as a basis for updates to the solution data.

In some implementations, the solution data can be generated based on an analysis of the solution profile data which can apply techniques, including machine-learning techniques, to the solution profile data to adapt the solution data. For example, the solution data can include the state data of other vehicles, which can be used to apply similar solutions to similar situations experienced by the vehicle or the vehicle's passengers.

In some implementations, the solution data can also be based on data from external sources (e.g., a remotely located cloud computing server). For example, solution data based on a solution data profile that is associated with a pathfinding task (e.g., navigating the vehicle around a flooded portion of a roadway) can retrieve additional data including real-time environmental data relating to the flooded portion of the roadway.

At operation 6050, solution complexity data is compared to vehicle manager proficiency data. The comparison of the solution complexity data to the vehicle manager proficiency data can be based on a comparison of data records within the respective solution complexity data and vehicle manager proficiency data to determine corresponding or matching data items. In some implementations, the comparison of the solution complexity data and vehicle manager proficiency data includes the use of machine learning to predict the vehicle manager or vehicle managers that are capable of managing the solution data effectively.

The solution complexity data can be associated with the solution data and the vehicle manager proficiency can be data associated with a plurality of vehicle managers (e.g., persons who can operate one or more vehicles, including autonomous vehicles). The solution complexity data can be indicative of the complexity (e.g., difficulty to complete) of a solution based on any of: a manually assigned solution complexity value based on the input of a vehicle manager, passenger, or other individual; a solution completion time based on how long the solution takes to complete (e.g., an average completion time); and an automatically generated solution complexity value based on the solution profile data, including applying the weighted values of properties or attributes of an aggregate solution profile data including all solution profile data to generate the solution complexity value.

At operation 6060, the solution data is assigned to a vehicle manager of the plurality of vehicle managers. For example, a vehicle manager can be assigned to handle a situation involving solution data based on the vehicle manager's level of experience (e.g., more experienced vehicle managers are assigned to solution data with a higher solution complexity value). The assignment of the solution data to a vehicle manager can be based on matching the respective vehicle manager proficiency data of the vehicle manager matching the solution complexity data. The vehicle manager proficiency data can be based on a vehicle manager proficiency value associated with the level of proficiency of the vehicle manager including the experience level of the vehicle manager (e.g., number of hours a vehicle manager has monitored or operated autonomous vehicles), success rate of the vehicle manager (e.g., the percentage of successful resolutions of issues with a vehicle), and data relating to the vehicle managers handling of similar issues associated with the solution data. By way of example, the matching of the vehicle manager proficiency data to the solution complexity data can be based on a comparison of the vehicle manager proficiency data to the solution complexity data (e.g., through a vehicle manager proficiency data database that includes corresponding solution complexity data).

Figure 7:
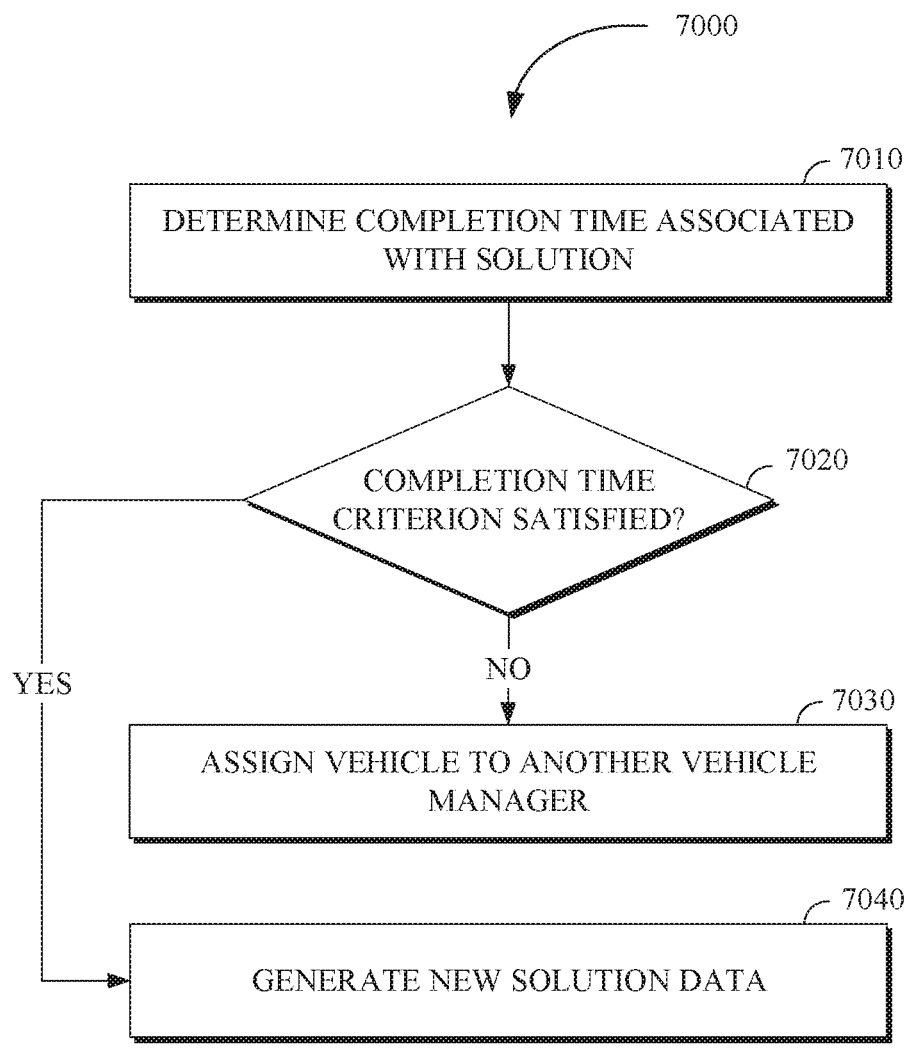
FIG. 7 is a flow chart of a technique for autonomous vehicle solution generation in accordance with the present disclosure.

FIG. 7 is a flow chart of a technique 7000 for solution generation in accordance with the present disclosure. The technique 7000 is utilized by a solution generation system that includes at least one fleet manager, vehicle manager, and the aforementioned interfaces. Some or all of the technique 7000 for solution generation may be implemented in a vehicle including the vehicle 1000 shown in FIG. 1, the vehicle 2100 shown in FIG. 2, or a computing apparatus including a controller apparatus such as the controller apparatus 2410 shown in FIG. 2. The controller apparatus can include a solution generation module or the controller apparatus can comprise a solution generation module. In an implementation, some or all aspects of the technique 7000 for solution generation can be implemented in a system (e.g., the controller apparatus 2410 of FIG. 2) combining some or all of the features described in this disclosure.

At operation 7010, a completion time associated with the solution data is determined. The completion time can be based on the amount of time that is used for completion a solution by an entity including any of a computing device (e.g., autonomous vehicle) and a person including a vehicle manager. The completion time can include any of: a time at which the solution (e.g., a task such as assisting the vehicle to navigate around an obstacle) associated with the solution data was completed (e.g., based on completion data sent to update the solution data as complete); a time period (e.g., a time period from 1:00 p.m. to 1:45 p.m.); and a time interval (e.g., fifteen minutes). The completion time can be based on a local timing device in the vehicle or at a remote location (e.g., an autonomous vehicle operations center or a time server device).

At operation 7020, a determination of whether the completion time associated with the solution data satisfies a completion time criterion is made. The determination can be based on a comparison of the completion time to a completion time criterion including a completion time threshold. Satisfaction of the completion time criterion can be based on whether the completion time exceeds, is equal to, or is less than, the completion criterion threshold time. For example, if the completion time threshold is based on completion of a solution in less than ten minutes, and the completion time is fifteen minutes, then the completion time criterion can be satisfied because the solution time threshold was exceeded.

In response to determining that the completion time associated with the solution data does not satisfy the completion time criterion, the technique 7000 proceeds to operation 7030. In response to determining that the completion time associated with the solution data satisfies the completion time criterion, the technique 7000 proceeds to operation 7040.

At operation 7030, the vehicle is assigned to another one of the plurality of vehicle managers. Assignment of the vehicle to another one of the plurality of vehicle managers can include transmitting a message including solution data and an indication of the assignment to either one of the vehicle managers (e.g., the assignor vehicle manager and the assignee vehicle manager). The determination that the completion time does not satisfy the completion time criterion can indicate that a more experienced vehicle manager should be assigned to the solution data. When the vehicle is assigned to another one of the plurality of vehicle managers, the initial vehicle manager can continue to work on the solution data (e.g., sharing the solution data between the vehicle managers). Assignment of the vehicle to another vehicle manager can include transmitting message data to the newly assigned vehicle manager to indicate that a vehicle has been assigned to the vehicle manager.

At operation 7040, new solution data is generated. The new solution data can be based on the solution data and can include an identifier associated with the identity of the entity associated with the solution data (e.g., a vehicle manager that completed the solution), the vehicle associated with the solution data, and the completion time for the solution associated with the solution data.

In some implementations, the new solution data can be added to the solution data (e.g., stored in the solution data) when a completion time criterion has been satisfied. In this way, the solution data can be selectively increased based on new solutions that were completed in an efficient way (e.g., within the time constraints of the time criterion), thereby providing vehicle managers in the future with a more efficient set of solution data from which to assist vehicles.

Figure 8:
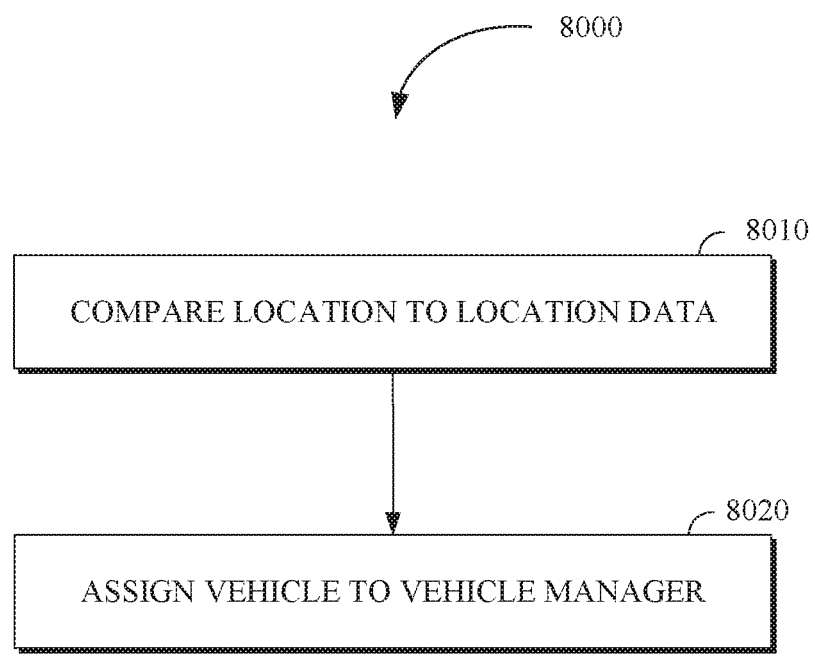
FIG. 8 is a flow chart of a technique for autonomous vehicle solution generation in accordance with the present disclosure.

FIG. 8 is a flow chart of a technique 8000 for solution generation in accordance with the present disclosure. The technique 8000 is utilized by a solution generation system that includes at least one fleet manager, vehicle manager, and the aforementioned interfaces. Some or all of the technique 8000 for solution generation may be implemented in a vehicle including the vehicle 1000 shown in FIG. 1, the vehicle 2100 shown in FIG. 2, or a computing apparatus including a controller apparatus such as the controller apparatus 2410 shown in FIG. 2. The controller apparatus can include a solution generation module or the controller apparatus can comprise a solution generation module. In an implementation, some or all aspects of the technique 8000 for solution generation can be implemented in a system (e.g., the controller apparatus 2410 of FIG. 2) combining some or all of the features described in this disclosure.

At operation 8010, the location of the vehicle is compared to location data including a plurality of locations associated with a plurality of vehicle managers. The location of the vehicle can be based on the state data (e.g., geographic coordinates of the vehicle) or on another data source including a remote data source (e.g., GPS). The plurality of locations associated with the plurality of vehicle managers can be based on location data that includes the locations at which autonomous vehicles have previously received assistance from the vehicle managers. The comparison of the location of the vehicle to the location data can include a comparison of the geographic coordinates of the location of the vehicle (e.g., latitude and longitude) to geographic coordinate data in the location data.

At operation 8020, a vehicle is assigned to a vehicle manager. The assignment of the vehicle to the vehicle manager can be based on a determination of the vehicle manager of the plurality of vehicle managers that is associated with the location of the plurality of locations that is the closest distance to the location. The determination of the closest distance to the location can be based on the comparison of the geographic coordinates of the vehicle to the geographic coordinate data in the location data. In this way, vehicle managers that have assisted a vehicle in a pathfinding task at the same location in the past can be assigned to assist other vehicles in the now more familiar location, which can be useful when assisting another vehicle within the same location.

Figure 9:
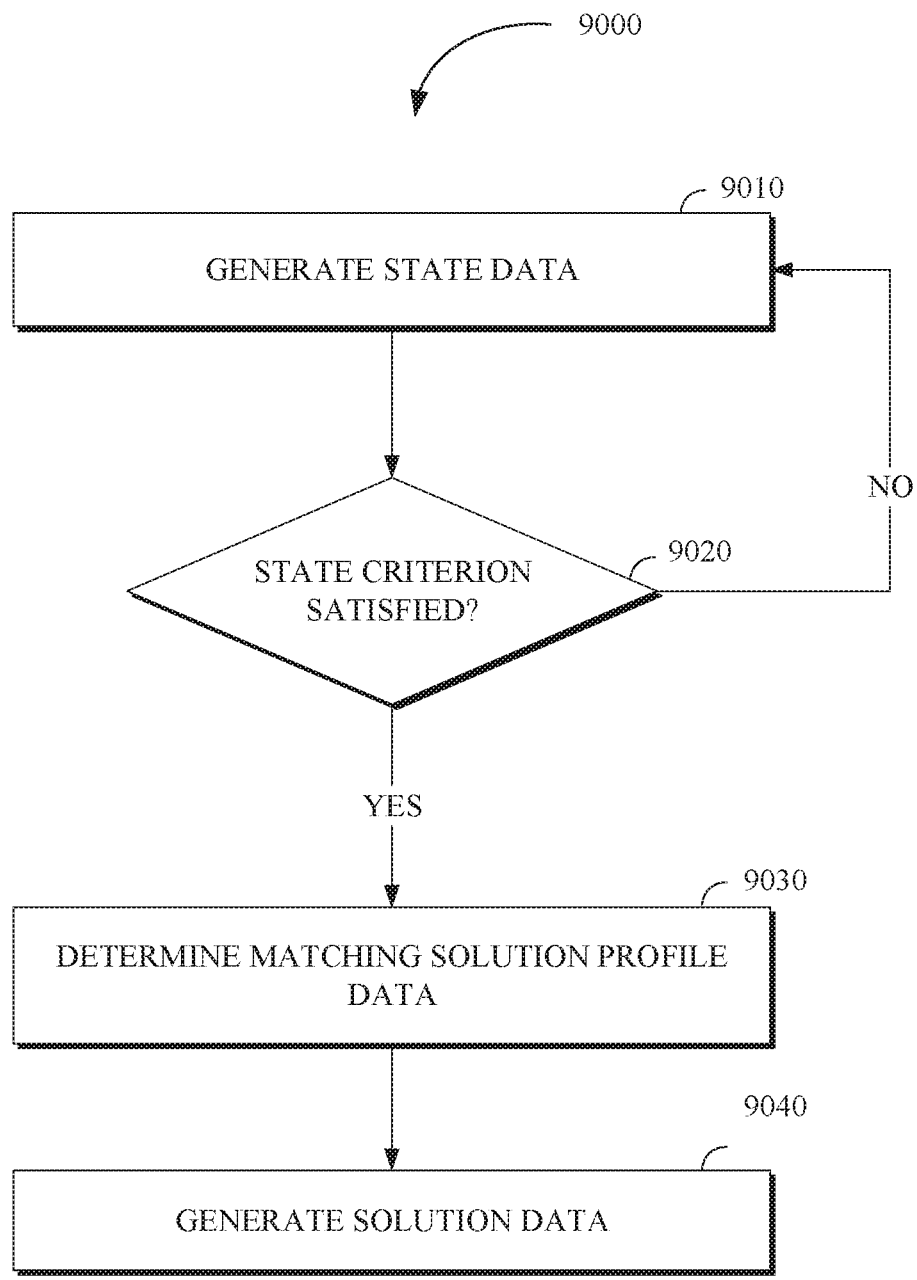
FIG. 9 illustrates a method for autonomous vehicle solution generation in accordance with the present disclosure.

FIG. 9 is a flow chart of a method 9000 for generating solution data in accordance with the present disclosure. The method 9000 can be carried out by a system including but not limited to the controller apparatus 2410 of FIG. 2 or various sub-components or sub-modules or sub-systems of the controller apparatus 2410 including but not limited to a solution generation apparatus. The method 9000 includes generating state data for a vehicle using received data including but not limited to sensor data of the vehicle and external objects within a vicinity of the vehicle (i.e., nearby or with a predetermined area) via 9010. The state data can include any of a location of the vehicle, a destination of the vehicle, an operational state of the vehicle, and information associated with a vehicle environment. A determination of whether the state data satisfies a state criterion is made via 9020. In response to determining that the state criterion is satisfied, a determination of solution profile data that matches the state data is made via 9030. The determination of whether the solution profile data matches the state data is made on the basis of a comparison of the state data to a plurality of solution profile data (e.g., solution profile data within a database) including the solution profile data. Solution data can be generated based on the matching solution profile data via 9040. The generated solution data can be transmitted to the vehicle for execution or remotely executed to alter operation of the vehicle.

In an implementation, the method 9000 includes comparing solution complexity data to vehicle manager proficiency data, wherein the solution complexity data is associated with the solution data and the vehicle manager proficiency data is associated with a plurality of vehicle managers, assigning the solution data to a vehicle manager of the plurality of vehicle managers based on vehicle manager proficiency data of the vehicle manager matching the solution complexity data.

In an implementation, the method 9000 includes, determining a completion time associated with the solution data and, in response to determining that the completion time associated with the solution data satisfies a completion time criterion, generating new solution data based on the solution data. Further, in response to determining that the solution data does not satisfy the completion time criterion, assigning the vehicle to another one of the plurality of vehicle managers. The method 9000 includes, adding the new solution data to the solution data, wherein the new solution data includes an identity of a vehicle manager associated with the new solution data.

In an implementation, the method 9000 includes, comparing the location of the vehicle to location data including a plurality of locations associated with a plurality of vehicle managers, and assigning, the vehicle to the vehicle manager of the plurality of vehicle managers that is associated with the one of the plurality of locations that is closest in distance to the location. The sensor data can include but is not limited to a physical state of a predetermined area, vehicle stoppage data, construction activity data, lane direction activity data, lane closure activity data, road surface condition data, and pedestrian activity data. The solution data includes any of instructions to navigate the vehicle along a solution path to the destination, activate a vehicle control system of the vehicle, and deactivate the vehicle control system of the vehicle The disclosed technology provides a solution generation system that more efficiently generates solutions for autonomous vehicles. The generated solutions can be distributed among operators including vehicle managers, based on the proficiency level of the operators. Further, the disclosed technology is able to factor the completion time associated with the solution data to selectively populate the solution data with new solution data based on successful resolution of problematic situations.

While the disclosed technology has been described in connection with certain embodiments, it is to be understood that the disclosed technology is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:
1. A method for generating solution data, the method comprising:
generating, by a controller apparatus of a remote system, state data associated with a vehicle using sensor data received from the vehicle and from external objects within a vicinity of the vehicle, the state data including any of a location of the vehicle, a destination of the vehicle, an operational state of the vehicle, and information associated with a vehicle environment;
determining, by the controller apparatus, that the state data satisfies a state criterion;
comparing, by the controller apparatus, the state data to a plurality of solution profile data to determine a matching solution profile data that matches with the state data, the plurality of solution profile data including an aggregation of solution data from past events in which assistance was provided to the vehicle;
generating, by the controller apparatus, the solution data based on the matching solution profile data; and
transmitting, by the controller apparatus, the solution data to the vehicle for execution.
2. The method of claim 1, further comprising:
comparing, by the controller apparatus, solution complexity data to vehicle manager proficiency data, the solution complexity data being associated with the solution data and the vehicle manager proficiency data being associated with a plurality of vehicle managers; and
assigning, by the controller apparatus, the solution data to a vehicle manager of the plurality of vehicle managers based on respective vehicle manager proficiency data of the vehicle manager matching the solution complexity data.
3. The method of claim 2, further comprising:
determining, by the controller apparatus, a completion time associated with the solution data; and
in response to determining that the completion time satisfies a completion time criterion, generating, by the controller apparatus, new solution data using the solution data.
4. The method of claim 3, further comprising:
in response to determining that the completion time does not satisfy the completion time criterion, assigning, by the controller apparatus, the vehicle to another one of the plurality of vehicle managers.

5. The method of claim 3, further comprising:
adding, by the controller apparatus, the new solution data to the solution data, the new solution data including an identity of the vehicle manager associated with the new solution data.

6. The method of claim 1, further comprising:
comparing, by the controller apparatus, the location of the vehicle to location data including a plurality of locations associated with a plurality of vehicle managers; and
assigning, by the controller apparatus, the vehicle to a vehicle manager of the plurality of vehicle managers that is associated with one of the plurality of locations that is closest in distance to the location.

7. The method of claim 1, wherein the sensor data includes a physical state of a predetermined area, vehicle stoppage data, construction activity data, lane direction activity data, lane closure activity data, road surface condition data, and pedestrian activity data.

8. The method of claim 1, wherein the solution data comprises instructions to navigate the vehicle along a solution path to the destination, instructions to activate a vehicle control system of the vehicle, and instructions to deactivate a vehicle control system of the vehicle.

9. A solution generation apparatus, comprising:
a memory; and
a processor configured to execute instructions stored in the memory to:
generate state data associated with a vehicle using sensor data received from the vehicle and from external objects within a vicinity of the vehicle, the state data including any of a location of the vehicle, a destination of the vehicle, an operational state of the vehicle, and information associated with a vehicle environment;
determine that the state data satisfies a state criterion;
compare the state data to a plurality of solution profile data to determine a matching solution profile data that matches with the state data, the plurality of solution profile data including an aggregation of solution data from past events in which assistance was provided to the vehicle;
generate solution data based on the matching solution profile data; and
transmit the solution data to the vehicle for execution.

10. The solution generation apparatus of claim 9, wherein the processor is further configured to execute instructions stored in the memory to:
compare solution complexity data to vehicle manager proficiency data, the solution complexity data being associated with the solution data and the vehicle manager proficiency data being associated with a plurality of vehicle managers; and
assign the solution data to a vehicle manager of the plurality of vehicle managers based on respective vehicle manager proficiency data of the vehicle manager matching the solution complexity data.

11. The solution generation apparatus of claim 10, wherein the processor is further configured to execute instructions stored in the memory to:
determine a completion time associated with the solution data; and
in response to determining that the completion time satisfies a completion time criterion, generate new solution data using the solution data.

12. The solution generation apparatus of claim 10, wherein the processor is further configured to execute instructions stored in the memory to:
compare the location of the vehicle to location data including a plurality of locations associated with a plurality of vehicle managers, and
assign the vehicle to the vehicle manager of the plurality of vehicle managers that is associated with the one of the plurality of locations that is closest in distance to the location.

13. The solution generation apparatus of claim 12, wherein the sensor data includes a physical state of a predetermined area, vehicle stoppage data, construction activity data, lane direction data, lane closure data, road surface condition data, and pedestrian activity data.

14. The solution generation apparatus of claim 9, wherein the solution data comprises instructions to navigate the vehicle along a solution path to the destination, instructions to activate a vehicle control system of the vehicle, and instructions to deactivate a vehicle control system of the vehicle.

15. A non-transitory computer-readable storage medium including program instructions executable by one or more processors of a controller apparatus that, when executed, cause the one or more processors to perform operations, the operations comprising:
generating state data associated with a vehicle using sensor data received from the vehicle and from external objects within a vicinity of the vehicle, the state data including any of a location of the vehicle, a destination of the vehicle, an operational state of the vehicle, and information associated with a vehicle environment;
determining that the state data satisfies a state criterion;
comparing the state data to a plurality of solution profile data to determine a matching solution profile data that matches with the state data, the plurality of solution profile data including an aggregation of solution data from past events in which assistance was provided to the vehicle;
generating the solution data based on the matching solution profile data; and
transmitting the solution data to the vehicle for execution.

16. The non-transitory computer-readable storage medium of claim 15, wherein operations further comprise:
comparing solution complexity data to vehicle manager proficiency data, the solution complexity data being associated with the solution data and the vehicle manager proficiency data being associated with a plurality of vehicle managers; and
assigning the solution data to a vehicle manager of the plurality of vehicle managers based on respective vehicle manager proficiency data of the vehicle manager matching the solution complexity data.

17. The non-transitory computer-readable storage medium of claim 16, the operations further comprising:
determining a completion time associated with the solution data; and
in response to determining that the completion time satisfies a completion time criterion, generating new solution data using the solution data.

18. The non-transitory computer-readable storage medium of claim 16, the operations further comprising:
comparing the location of the vehicle to location data including a plurality of locations associated with a plurality of vehicle managers; and
assigning, the vehicle to the vehicle manager of the plurality of vehicle managers that is associated with the one of the plurality of locations that is closest in distance to the location.

19. The non-transitory computer-readable storage medium of claim 18, wherein the sensor data includes a physical state of a predetermined area, vehicle stoppage data, construction activity data, lane direction data, lane closure data, road surface condition data, and pedestrian activity data.

20. The non-transitory computer-readable storage medium of claim 15, wherein the solution data comprises instructions to navigate the vehicle to a location, instructions to activate a vehicle control system of the vehicle, and instructions to deactivate a vehicle control system of the vehicle.

* * * * *